(No Model.) 7 Sheets—Sheet 1.

B. F. ORTON.

DYNAMO ELECTRIC MACHINE.

No. 331,815. Patented Dec. 8, 1885.

Witnesses:
Ernest Abshagen

Inventor:
Benjamin F. Orton
By his Attorney:

(No Model.) 7 Sheets—Sheet 2.

B. F. ORTON.
DYNAMO ELECTRIC MACHINE.

No. 331,815. Patented Dec. 8, 1885.

Witnesses:
Ernest Abshagen
Chs. Torney

Inventor:
Benjamin F. Orton
By his Attorney:

(No Model.) 7 Sheets—Sheet 3.

B. F. ORTON.
DYNAMO ELECTRIC MACHINE.

No. 331,815. Patented Dec. 8, 1885.

Witnesses:
Ernest Abshagen
Chr. Dooney

Inventor:
B. F. Orton
By his Attorney: H. C. Townsend (No Model.) 7 Sheets—Sheet 4.
B. F. ORTON.
DYNAMO ELECTRIC MACHINE.
No. 331,815. Patented Dec. 8, 1885.
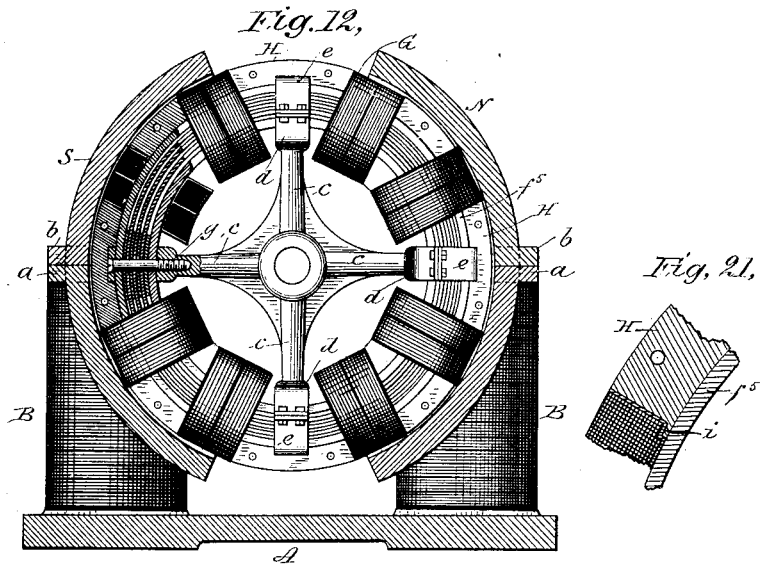
Fig. 12.
Fig. 21.
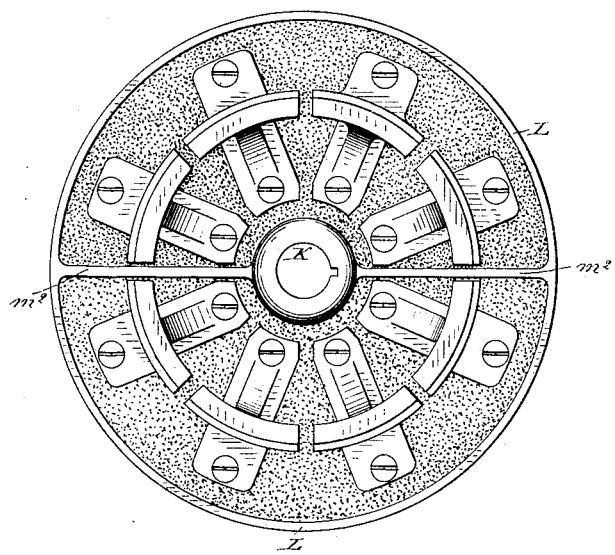
Fig. 10.
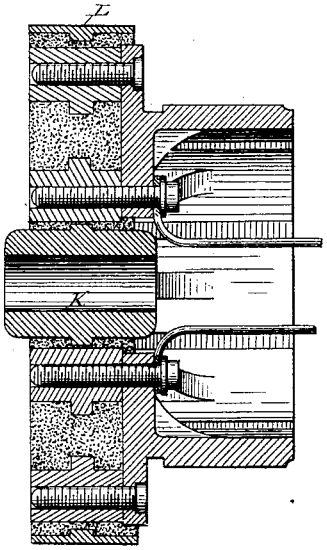
Fig. 11.
Witnesses:
Ernest Abshagen
Chs. Toomey
Inventor:
Benjamin F. Orton
By his Attorney: H. C. Townsend (No Model.) 7 Sheets—Sheet 5.
B. F. ORTON.
DYNAMO ELECTRIC MACHINE.

No. 331,815. Patented Dec. 8, 1885.

Witnesses:
Ernest Abshagen

Inventor:
Benjamin F. Orton
By his Attorney:

(No Model.) 7 Sheets—Sheet 6.
B. F. ORTON.
DYNAMO ELECTRIC MACHINE.
No. 331,815. Patented Dec. 8, 1885.
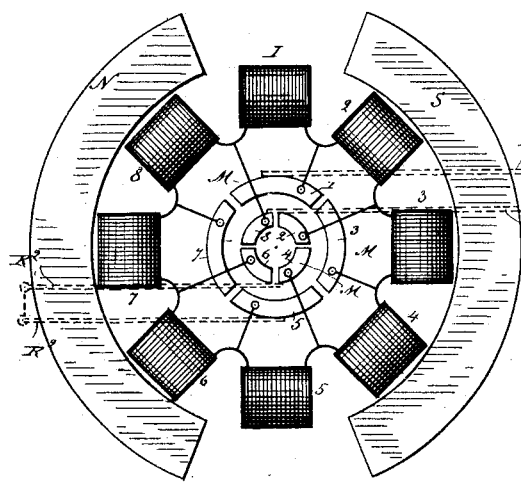
Fig. 15.
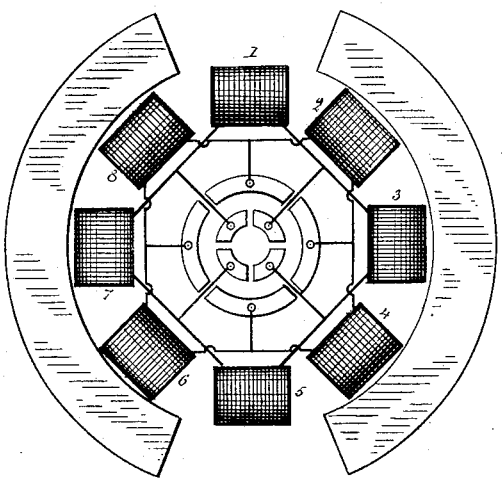
Fig. 16.
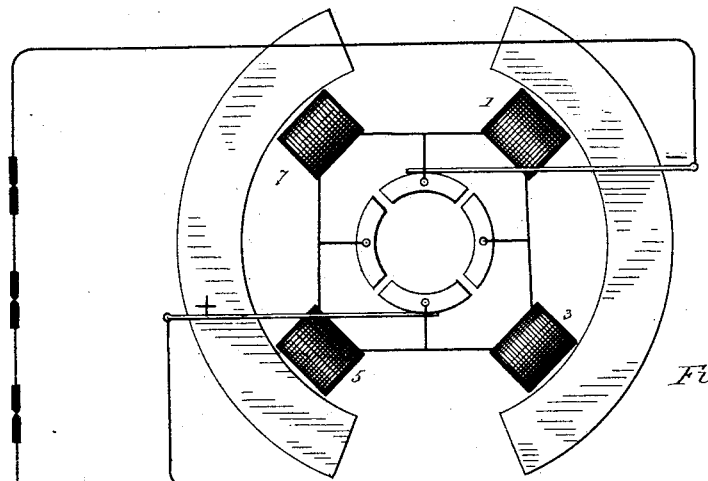
Fig. 17.
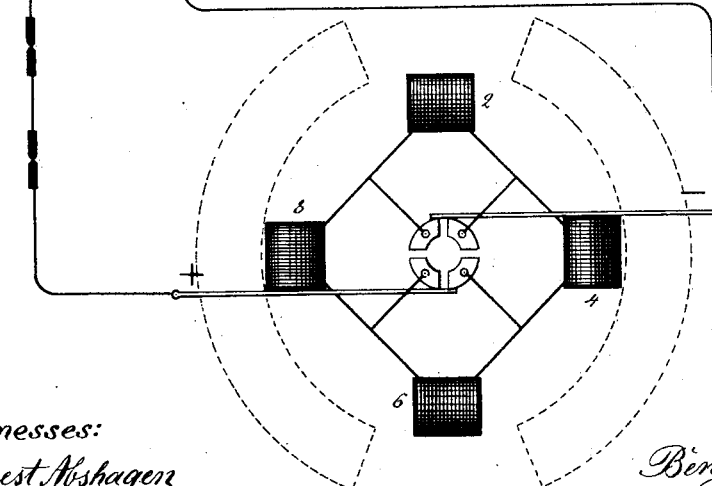
Witnesses:
Ernest Abshagen
Chs. Dorney
Inventor:
Benjamin F. Orton
By his Attorney: H. C. Townsend (No Model.)  7 Sheets—Sheet 7.
B. F. ORTON.
DYNAMO ELECTRIC MACHINE.
No. 331,815.  Patented Dec. 8, 1885.
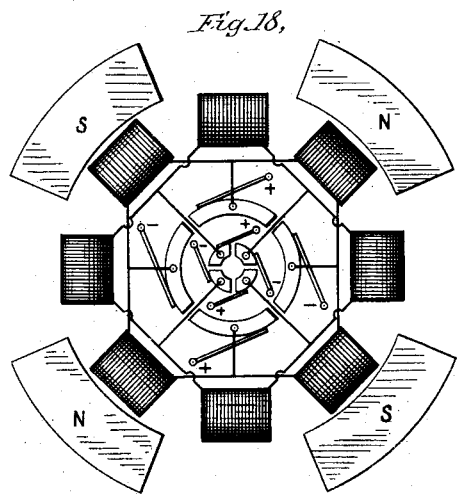
Fig. 18.
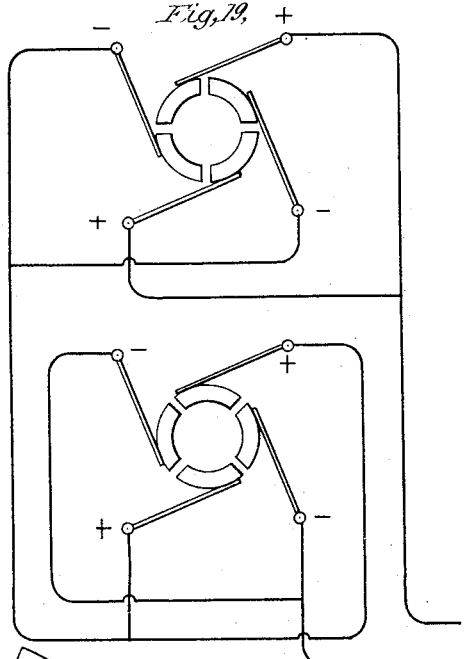
Fig. 19.
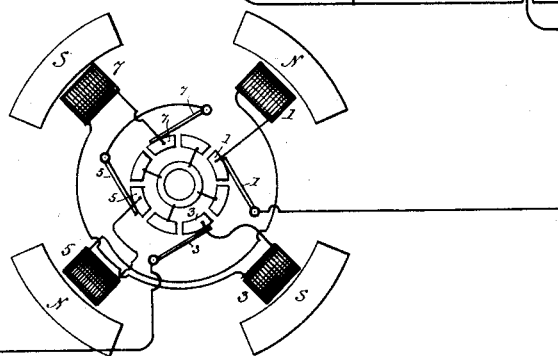
Fig. 20.
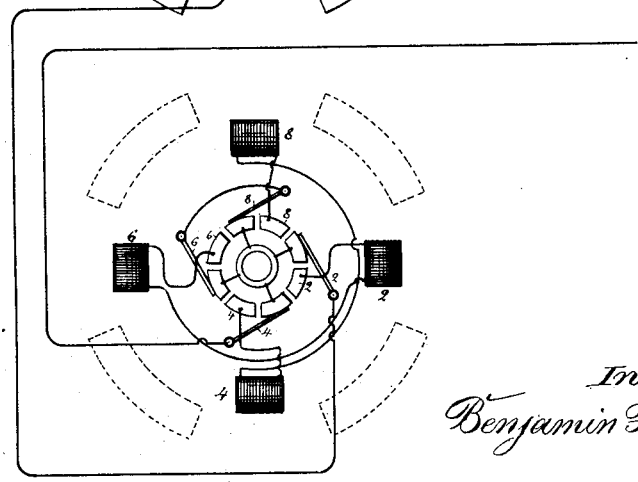
Witnesses:
Ernest Abshagen
Chs. Toomey
Inventor:
Benjamin F. Orton
By his Attorney: W. C. Townsend

UNITED STATES PATENT OFFICE.

BENJAMIN F. ORTON, OF EAST SAGINAW, MICHIGAN.

DYNAMO-ELECTRIC MACHINE.

SPECIFICATION forming part of Letters Patent No. 331,815, dated December 8, 1885.

Application filed February 4, 1885. Serial No. 154,895. (No model.)

*To all whom it may concern:*

Be it known that I, BENJAMIN F. ORTON, a citizen of the United States, and a resident of East Saginaw, in the county of Saginaw and State of Michigan, have invented certain new and useful Improvements in Dynamo-Electric Machines, of which the following is a specification.

My invention consists in certain improvements in the details of construction and the combinations of parts that will be more particularly set out in the following description, in connection with the accompanying drawings, and will be particularly stated in the claims.

Figure 1:
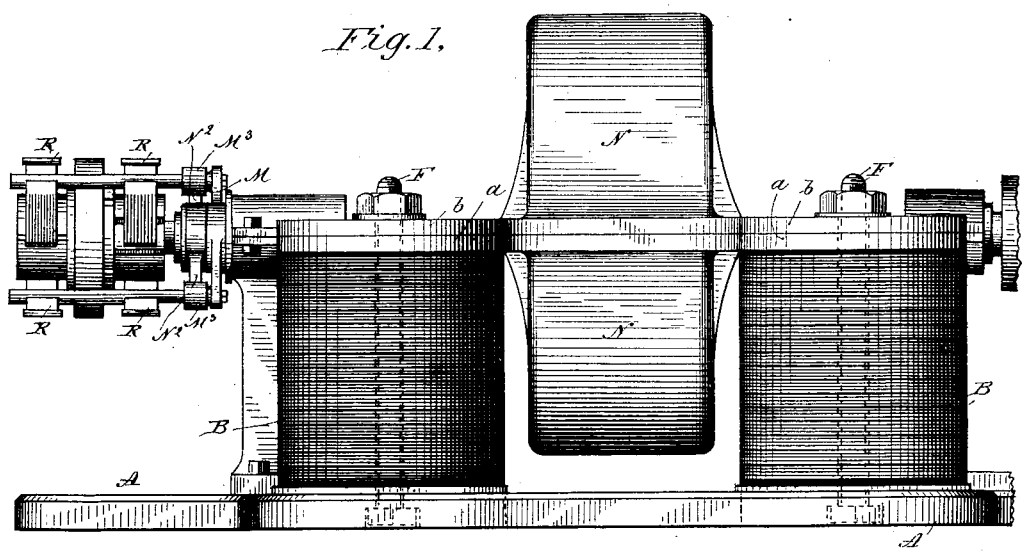
Figure 2:
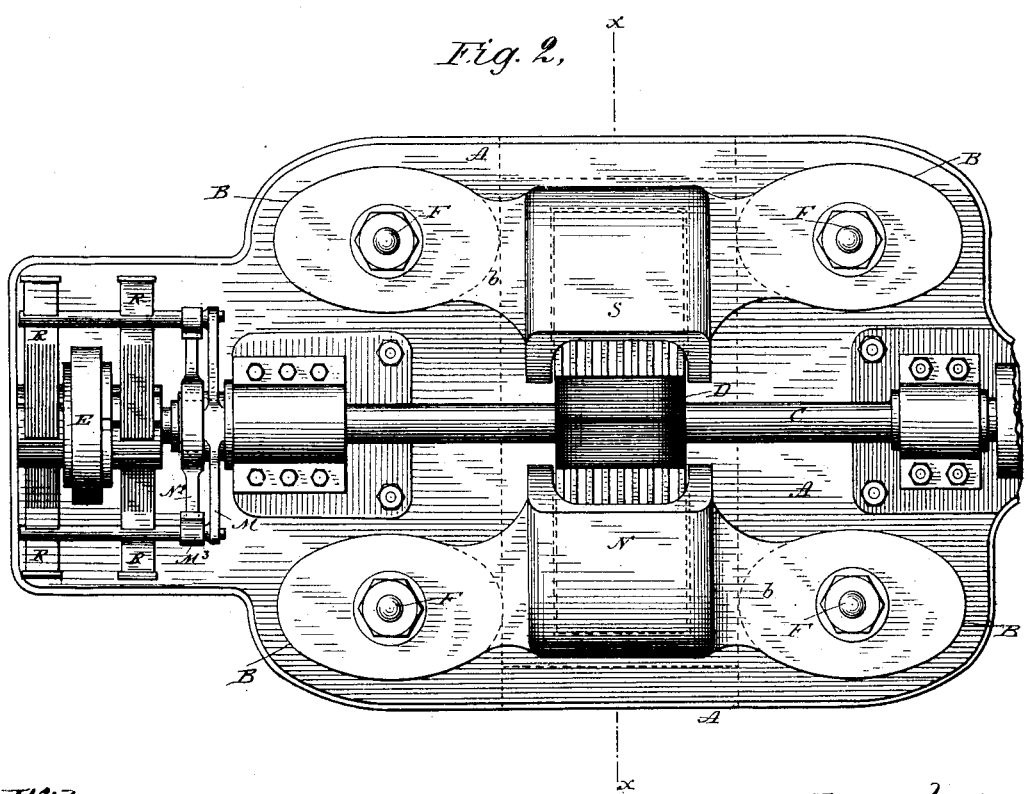
Figure 3:
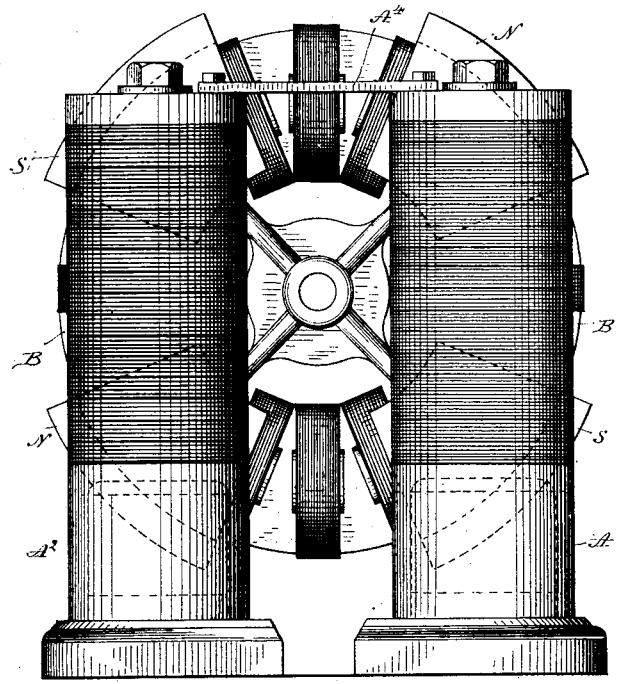
Figure 4:
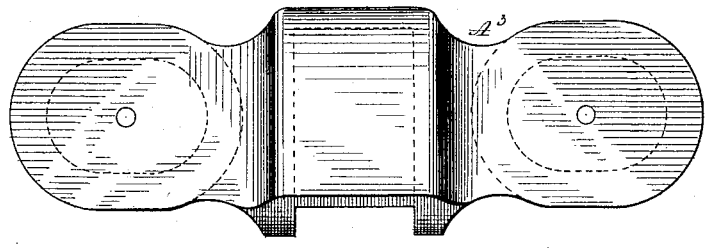
Figure 5:
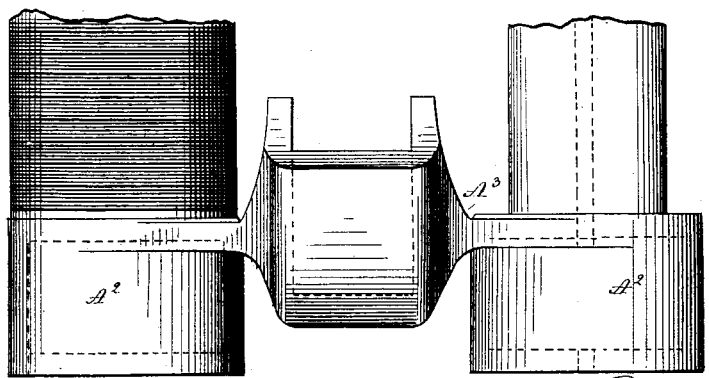
Figure 8:
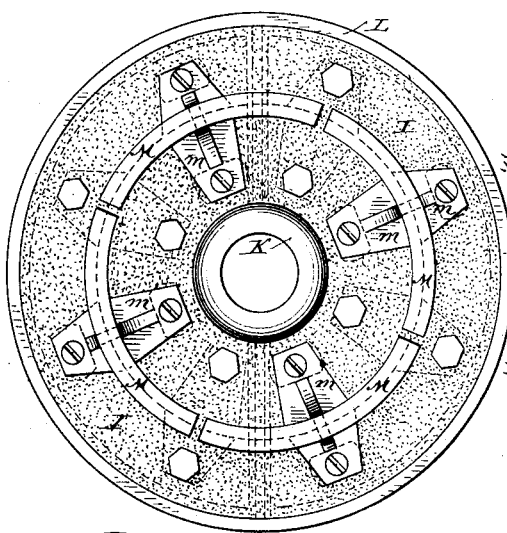
Figure 9:
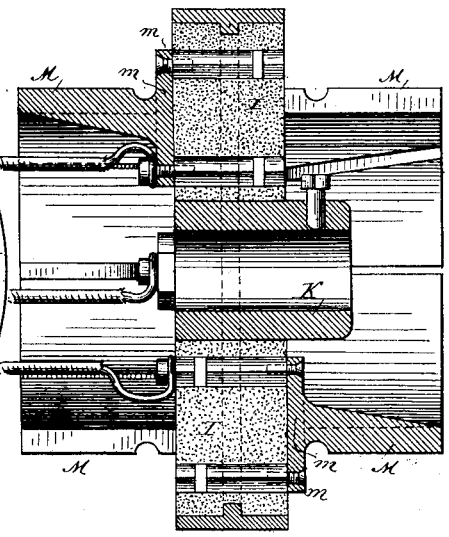
Figure 6:
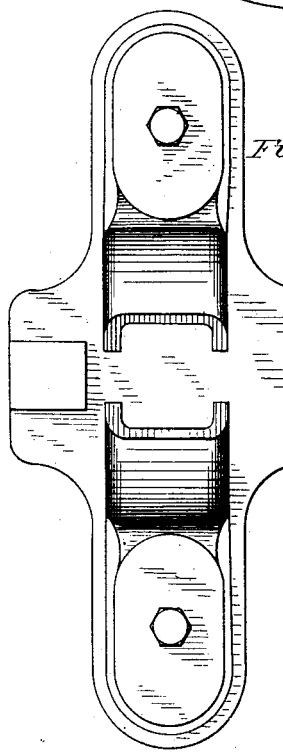
Figure 7:
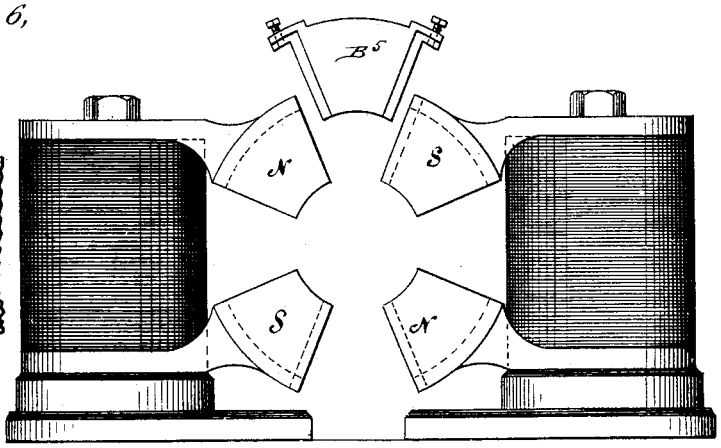
Figure 13:
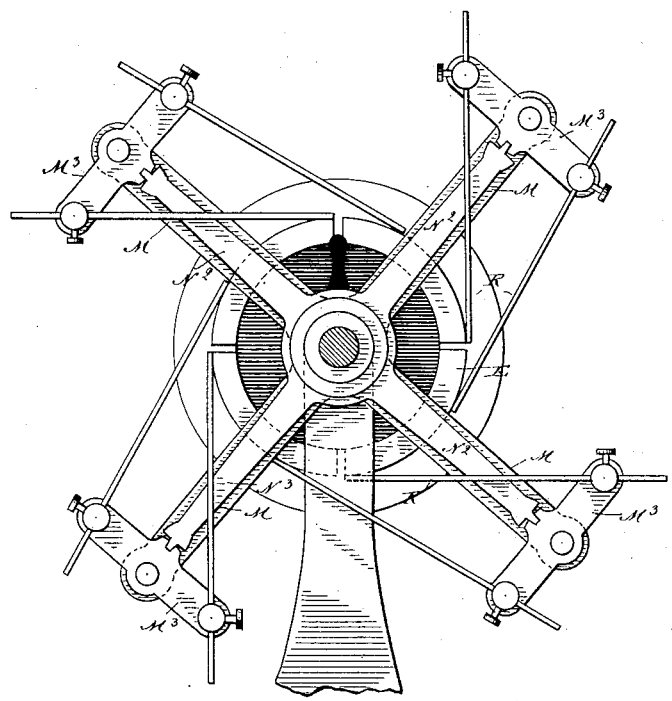
Figure 14:
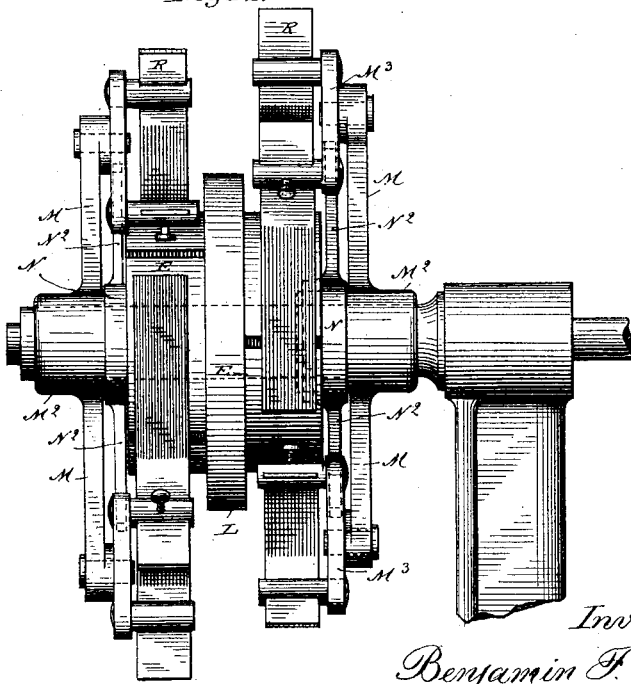

In the drawings, Figure 1 is a side elevation of a dynamo-machine constructed in accordance with my invention. Fig. 2 is a plan view of the same. Fig. 3, Sheet 2, is an end elevation of a modified form of a machine constructed in accordance with my invention, and shows a field-magnet with four field-of-force poles. Fig. 4 is a plan of one side of the field-magnet. Fig. 5 is a side elevation of the lower portion of the field-magnet. Fig. 6, Sheet 3, is a plan of a modified form of the field-magnet having four poles. Fig. 7 is a side elevation of the same. Fig. 8 is an end view of the commutator-cylinder. Fig. 9 is a longitudinal section of the commutator-cylinder. Figs. 10 and 11, Sheet 4, are similar views of a modified form of the commutator. Fig. 12 is a partial cross-section on the line $xx$ of Fig. 2. Fig. 13, Sheet 5, shows in detail and in end view the commutator with the brushes applied to the cylinder. Fig. 14 is a plan view of the same. Figs. 15, 16, and 17, Sheet 6, illustrate diagrammatically ways of connecting the armature-coils to the commutator in the two-pole machine. Figs. 18, 19, and 20, Sheet 7, illustrate ways of connecting the armature-coils in the four-pole machine. Fig. 21 is a longitudinal section through a portion of the armature, showing the manner in which the bobbins and separating-pieces interlock.

B B B B indicate four field-of-force magnets, mounted upright upon a suitable base and supporting on their upper ends field-of-force poles for the armature of the machine. Two of these magnets conspire to give one polarity, as north, to the field-of-force pole N, and the two others to give south polarity to the pole S. The magnets rest upon a suitable base, A, which may be either of magnetic or non-magnetic material. It is preferably of magnetic material; but in such case it is desirable to cut away the central portion, as indicated by the rectangular dotted outline, Fig. 2, beneath the depending portions of the field-of-force poles, in order to prevent the magnetism of each magnet from forming a closed circuit in itself through such portion of the pole-piece and the base. In order still better to secure such result, the base may be made in two pieces, the division being between the magnets on a line transverse to the armature-shaft. This would be equivalent to cutting away that portion of the base between the two dotted lines extending across from one side of the base to the other.

C indicates the armature-shaft; D, the armature, and E the commutator. The construction of said armature and commutator and the manner of connecting up the coils in the armature to one another and to the commutator will be described further on.

In order to permit the armature to be readily removed from the machine, the whole or a portion of each curved pole-piece is made detachable from the tops of the field-magnets. In the present instance that portion only of each pole-piece that is above the horizontal central line of the armature prevents its removal, and therefore that portion only of the pole-piece is made detachable. The portion of each pole-piece that extends down below the tops of the field-magnets is made integral with a plate, $a$, secured to or formed in one piece with two of the magnet-cores. The upper portion is formed in one piece with a second plate, $b$, extending across from the head of one magnet to the other on the same side of the armature. The latter plate is held in place by bolts F F, which extend down through the magnet-cores, as indicated by the dotted lines in Fig. 1. The heads of the bolts are preferably beneath the base-plates, and the nuts are at the upper end, as shown, so that by simply removing said nuts the pole-pieces may be detached, and the armature then removed, after taking off the tops of the journal-boxes in which it runs. The pole-pieces are grooved or channeled in the arc of a circle, as shown, and project toward one another on a line transverse to the armature-shaft. The dividing-plane between them is a vertical plane parallel with the axis of the field-magnets.

When a four-pole machine is constructed, a slight modification is made in order to bring the lower ends of the magnets sufficiently above the base to leave room for the pole-pieces, which in such case are applied two at the upper and two at the lower end of the magnets. In Fig. 3 this construction is indicated, the view being taken on a line coinciding with the line of the armature-shaft, while in Fig. 5 two magnets parallel with the armature-shaft are shown. Each magnet is formed with a hollow pedestal, $A^2$, which may be made of iron or not, as desired, and the two magnets on each side parallel with the shaft are connected at each end by plates or bridges $A^3$, formed at their intermediate portions into properly-shaped pole-pieces N S N S, the pole-piece at one end of each pair being north, while the pole-piece at the opposite end is south. The polarities of the pole-pieces are arranged so that they will be alternately north and south, progressing circumferentially around the armature. Each lower connecting-piece, $A^3$, may be formed in one piece with its two magnets, or may be attached to them. The upper connecting-plates are detachable, to permit the removal of the armature, and are secured by bolts passing down through the magnets. The base of the machine is divided up to prevent short-circuiting of the magnetism. The connecting-plates $A^3$ for the pair of magnets on each side of the armature-shaft connect the parts and form a rigid frame, consisting, essentially, of a rectangle set upright, and wound to have two consequent points, N S, one at top and the other at the bottom. The pedestals $A^2$ are the pillars or feet for the frames. The two frames on the two sides of the armature-shaft may be tied together by non-magnetic pieces, such as indicated at $A^4$, Fig. 3, consisting of bars of brass or other suitable material.

It may sometimes be desirable to transform a four-pole into a two-pole machine, which may be accomplished, as shown more clearly in Fig. 7, in connection with a slightly different form of field-magnet, by fitting a magnetic connecting-piece properly grooved or channeled to form a portion of a pole-piece into the space between the two upper poles N and S, Fig. 3, and a similar one into the space between the two lower poles N S, such connecting-piece serving to unite the two pole-pieces at each end into one. The winding or connection of the legs B of the field-magnet is in such case changed, so that all four shall tend to induce in the mass of iron connected to their upper ends, the same polarity as, say, north, and an opposite polarity, south, at their lower ends, so as to convert the compound lower pole-piece into a south pole.

In Figs. 6 and 7 the four poles are shown as produced by two field-magnets, instead of by the four magnets of Fig. 3. In this case the pole-pieces are made to extend in a direction toward the armature-shaft, and other pole-pieces projecting from the other magnet upon the other side of the shaft, instead of lying between two field-magnet legs on the same side of the shaft. Each magnet-leg produces two of the four pole-pieces, one pole-piece being connected to each end of both magnets. The magnets would be wound or connected so as to give the polarities N S N S, as indicated in Fig. 7, to the pole-pieces when the machine is a four-pole machine. To make it into a two-pole machine, connecting-pieces, such as $B^5$, are inserted above and below, and the winding or connection of one magnet is reversed, so that the two magnets shall conspire to produce the same polarity at the same end. The connecting pole-section $B^5$ may be fitted by a tongue and groove or otherwise, and secured by bolts or screws passing through ears or extensions provided upon the pole-section $B^5$, as indicated.

The mechanical construction of the armature is shown in Figs. 2, 3, and 12. Said armature consists, essentially, as described in prior Patents Nos. 308,851 and 309,735, of a series of thin sheet-iron plates piled upon one another, and supported in a spider or frame secured to the armature-shaft. The supporting-frame consists of a suitable number of radial arms, $c$, secured to a hub, and furnished at their outer ends with enlargements $d\ d$, having upturned sides, and constituting the supports for the armature-core. Stirrups or clamping-pieces $e$ extend wholly or partially across from one side of the armature to the other, and are fastened to the upturned sides of the rests or seats $d\ d$. Instead of such clamping-pieces, bolts or screws, such as indicated at $g$, may be used. These screws extend radially into the ends of the arms $c\ c$, and, by passing through the series of superposed iron plates, bind the whole together. Washers or separating-pieces are interposed between the thin iron plates at suitable points, preferably where the bolts $g$ may pass through them. The plates making up the body of the armature are preferably sections of the complete circle, so as to permit the armature-bobbins to be slipped on after being wound. The ends of adjoining segments abut preferably beneath clamping-plates, and the sections of the armature-core may be held together by a retaining-band, $f^5$, of iron.

In Fig. 12 the bobbins G are shown as in place. Each consists, preferably, of two portions, each portion having the ends of its wire coil free, so that they may be connected in multiple arc or in series to a commutator or commutators. After being slipped into place upon the armature the bobbins are held the proper distance apart by compound separating-pieces H, formed of a series of plates set on edge and held together by bolts or other devices. The individual plates are kept separate by interposed washers.

The plates of two separating-pieces are shown in edge view in Fig. 2 at each side of the bobbin. At each end they are furnished with projections or toes $i$ (see Fig. 21) at their inner periphery, which are slipped between the bobbin and the armature-core, so as to firmly hold the bobbin against any movement. The spaces on the sides of the armature between the bobbins are also filled with iron plates built up to a sufficient thickness to bring the magnetic material of the core flush with the outer surface of the bobbin, as indicated in Fig. 2. The latter plates are V-shaped, and extend out flush with the periphery of the separating-pieces H. They are secured to the latter preferably by the same bolts which hold the plates of the pieces H together, and are separated from one another by washers or separating-pieces, so as to leave free air-spaces between them.

In Fig. 12 eight bobbins are shown in place upon the armature. They are connected to one another, as shown in other figures, and to the commutator, the preferred constructions of which latter are shown more clearly in Figs. 8, 9, 10, 11, 13, and 14.

In Fig. 8 the commutator-disk is shown in elevation. It consists, essentially, of a plate of cement or other suitable insulating material, cast or secured in a frame of metal or other suitable strengthening material, and having the commutator-plates secured to its face.

I indicates a slab or mass of cement, concrete, or other insulating material cast around or secured to a hub, K, which latter is adapted to be secured to the armature-shaft. The hub is preferably provided with projections or recesses or with arms (indicated in dotted lines) that will serve to prevent the disk from turning on the hub.

L indicates a circumferential band or frame around the disk, of concrete, for the purpose of preventing the disk from breaking by centrifugal force during rotation. The disk may be cast in the frame, or the frame may be cast and applied after formation of the disk. Commutator-plates, eight in number, are secured to the disk, four on one side and four on the opposite side. They are provided with the radial or rectangular plates or extensions $m$, extending radially inward and outward, as shown, and through these plates $m$ pass the screws or bolts which secure the commutator-plates to the faces of the disk. The bolts or screws may pass into or through openings in the material of the disk itself, or into blocks or plates cast or let into the body of the disk, as indicated. The bolts or screws beneath or at the inner side of the commutator-plates are utilized for the attachment of the wires connecting the armature-coils with the commutator-plates, as shown in Fig. 9. The plates on the two sides of the disks are designed to form the plates of one and the same commutator and armature-coil system, and the said coil system is to be connected to said plates in rotation, first on one side and then on the opposite side of the disk, as more clearly indicated in the diagram Fig. 15. The two sets of plates, as shown, break joint, the spaces on one side being opposite the middle of the plates upon the other. The connections are such as will be more clearly explained in connection with the diagram Fig. 15; but the effect and object is to put those plates which in an ordinary commutator are contiguous, and between which sparking or short-circuiting is liable to occur, upon opposite sides of the disk and out of dangerous proximity to one another.

In Figs. 10 and 11 the commutator-plates are all massed upon the same side of the disk, this being the ordinary way of arranging them with relation to one another, and being adapted for any of the systems of winding or connection that it may be desired to apply to the armature-coils. The strengthening or supporting frame for the concrete disk is here shown of a little different shape. The circumferential band or ring L is connected with the hub by radial arms or wings $m^2$, of any desired number, which have the effect of still further giving strength and stability to the structure without depriving it of its essential characteristic. They serve also to prevent the insulating-disk from turning on the hub. The arms $m^2$ extend from and, if desired, are formed in one piece with the hub K, and the hub K, arms $m^2$, and band L may be cast all in one piece, and together constitute the strengthening-frame for the cement or concrete disk.

In order that the bobbins may be kept in connection with the collecting-brushes while they are active, the commutator-plates are either given a greater conducting length by making the slots between them at an angle to the axis, as is well understood in the art, or, the plates remaining of limited length, the brushes are kept longer in contact by making the same in two or more parts, placed one behind the other. The latter is the plan illustrated in Figs. 13 and 14, where I have shown the four sets of brushes for a four-pole machine, the commutator cylinder being here indicated as of the ordinary construction for the sake of simplicity.

In order that all of the brushes may be quickly and simultaneously removed from the commutator-cylinder when desired, I have devised the construction more particularly illustrated in these figures.

M M M, &c., indicate the four arms of a rocking frame, of usual or ordinary construction, supporting at their ends brush-holders M³, which are pivoted as shown, and are provided at opposite sides of the pivots with clamps for two commutator-brushes.

M² indicates the hub or sleeve for the rocker-arms, which hub or sleeve is supported in proper manner to permit the frame to be turned so as to shift the position of the brushes circumferentially upon the commutator-cylinder. Sleeved upon the hub M² is a ring or sleeve, N, carrying arms N², one for each of the holders M³. The arms N² engage with the holders M³, in the manner indicated, by means of projections entering notches in the holders, or in any other suitable manner, so that upon rotating said arms to a limited extent by turning the hub or ring N the holders will be turned on their pivots and the brushes will be lifted from contact with the commutator-cylinder. The mechanism by which the brushes are thus lifted being supported on the rocking frame, the latter may be used, as is obvious, in the ordinary way for shifting the brushes circumferentially upon the commutator-cylinder without interference with or from the mechanism by which the brushes are lifted, while the lifting mechanism may be operated at any time desired and the brushes simultaneously lifted in any position of the rocker frame or arms by which the brush-holders are carried.

In Fig. 15 I have shown one manner of connecting the coils of the eight-bobbin armature to the commutator having its plates disposed alternately on opposite faces of the non-conducting disk, in the manner indicated in Figs. 1 and 9.

For the purpose of more clearly illustrating the principle, the two cylinders formed by the four plates on each side of the disk are illustrated as of different circumference, one being indicated in the diagram as within the other.

The compound brush R R consists of two simple brushes, one bearing on one cylinder and the other upon the other cylinder. The two parts of such brush are electrically connected in any desired manner, the preferable construction being that illustrated in Fig. 1, where they are shown as supported by the same metallic conducting arm or holder. The compound brush R² R², of opposite polarity, may be carried or mounted in a similar manner. The coils are numbered consecutively from 1 to 8, and are here shown as connected up to one another in an endless series or closed circuit, with brushes taken from the joints between the bobbins or coils to the segments of the commutator. This method of connection is in principle the well-known "Pacinotti or Gramme system of connections, but differs therefrom in the fact that the connections are not made consecutively and in order to segments of the same commutator-cylinder, but alternately to two different cylinders. Thus the connection between bobbins 1 and 2 is taken to a segment of one cylinder—say the outer—the connection between 2 and 3 to a segment upon another cylinder, (the inner,) that between 3 and 4 to the outer, and so on in order. The segments are of course properly disposed in the circumference of their cylinders to shift to or from the positive or the negative brush at the proper time, and according to this rule of disposition the two cylinders naturally break joint with one another. By this plan segments of the commutator—as, for instance, one and two, between which short-circuiting or sparking is more liable to occur—are removed from one another to opposite sides of an insulating-disk, instead of being in the same circumference with one another and separated only by a narrow slot.

This plan of disposing the commutator-segments for an armature system of coils may be adopted for other systems of winding with good results, and is obviously applicable to open-circuit as well as closed-circuit machines. It is obviously not limited to any particular number of coils. In the diagram Fig. 15 all the coils of the armature are shown connected in the same system. In Fig. 16 they are divided into two sets, each connected in closed circuit by itself, alternate coils, as 1 3 5 7, being in one set, and the remaining coils, 2 4 6 8, being in the other. As many coils as may be deemed desirable may be used upon the armature connected in this way. The coils of one set are connected after the Gramme fashion to the commutator-cylinder upon one side of the disk, and the coils of the other to the commutator-cylinder upon the other side of the disk.

The commutator-brushes may be connected in any desired manner for taking off the currents from the two sets combined, either for quantity or for tension. The manner of connecting them for tension is illustrated diagrammatically in Fig. 17, where the positive brush for one set is connected to the negative of the other and the remaining brushes to the working-circuit. In this arrangement the supports for the two sets of brushes must obviously be insulated from one another.

To get quantity effects, the positive brushes may be connected together, and the two negative also connected together. The principle here illustrated might obviously be carried out with a greater number of coils, and the coils might obviously be divided into a greater number of sets, additional commutator-cylinders being provided, according to the number of sets of coils employed.

When the machine is used with four poles instead of two, the disposition and connection of coils illustrated diagrammatically in Figs. 18 and 19 may be used when the coils are connected up in closed circuit. In the case illustrated but eight coils are supposed to be upon the armature, and the coils are divided into two sets, one connected to one commutator-cylinder and the other to the other commutator-cylinder. The four brushes applied to each cylinder are applied in the well-known way at points opposite the divided line between the pole-pieces or at points slightly ahead in the direction of revolution of the armature. The coils might be divided into three or more sets connected in a similar way to three commutator-cylinders.

A good way of connecting the brushes so as to combine the currents from sets is shown in Fig. 19. According to this arrangement the two positive brushes of one set are connected together for quantity, and in a similar way the two negatives of the same set. The brushes of the other set are connected in a similar way, and the currents of one set as thus collected are combined with the currents of the other set for tension by connecting the compound positive brush of one set to the compound negative of the other set and the remaining compound brushes to the working-circuit. If a larger number of sets were employed, they might all be connected in the same manner.

In Fig. 20 I have shown a preferred disposition and connection of the coils for my four-pole machine, whereby the currents of all the bobbins may be combined for tension. In this instance the eight coils are divided into two sets of four each, alternate coils being taken for the same set. Each set is provided with a commutator having four active or collecting segments and four inactive or circuit-completing spaces or parts, whereby when one set is in an inactive or open-circuited position the current from the other or active set may find circuit through the brushes for the first or inactive set and the circuit-completing portions of the commutator upon which the brushes at such time rest. The coils of the two sets are shown in their relative positions as respects the four field-of-force poles.

The connections are as follows: Referring to the upper set, (marked 1 3 5 7,) coils 1 and 5, which at the same time are both opposite north or south poles of the field-magnets, have the inner end of 2 connected to the outer end of 1, and the remaining ends connected to the segments 5 1 of the commutator. The segments are so arranged or the brushes are so applied that the current shall be collected from them while they are passing through magnetic fields or are active, but that the brushes shall be out of contact with the segments when the bobbins are passing the space between adjoining field-poles and are inactive. The length of the conducting-segments is determined by circumstances—as, for instance, the length of each of the pole-pieces. The coils 3 and 7 are connected in a similar manner to the commutator-segments numbered 3 and 7. The brushes are numbered to correspond. As will be obvious from this arrangement, coils 1 and 5 combine their currents for tension, as do also coils 3 and 7. To combine all four for tension, it is only necessary to connect a positive brush, as 7, to a negative brush, as 5, the remaining brushes being connected to another set of coils or to the working-circuit.

Between the commutator-segments 1 3 5 7 is a second set of segments or conducting-plates, upon which the brushes rest when out of contact with the segments 1 3 5 7—that is, while the coils are passing neutral points. The segments of this second set are electrically united by connecting them to a ring of conducting material, as indicated, or in other suitable manner. These segments may be four of the segments of an eight-segment commutator, such as hereinbefore described. The set of coils 2 4 6 8 are similarly connected to a commutator and brushes, so that the currents from such four bobbins will be united for tension, and provision is also made for a circuit through the commutator independent of that through the coils 2 4 6 8 when the latter are passing neutral points. Brushes 8 and 6 for the latter system of coils are connected, and one of the remaining brushes, as 2, is connected to the terminal 3, of opposite polarity, for the other set. The last brush, 4, is connected to one pole of the working-circuit, while the brush 1, which is of opposite polarity, is connected to the other pole of said circuit. By tracing the circuits it will be seen that if all the coils are active their currents will combine in series. While one set is inactive the current from the other set, which is then at its maximum, will flow through the commutator for the first set without flowing through the coils of such set, and vice versa, so that in effect all the coils of the machine which at any time are active or connected into the general circuit are combined for tension, and the inert resistance of inactive coils is not experienced by those coils which are active. The commutator of each set, although such set consisted of four coils, would in this arrangement be an eight-segment commutator, having four of its segments active or collecting segments and its alternate segments inactive or shunting segments, such inactive segments being electrically united by any desired means.

The special form of field-magnet illustrated in Figs. 6 and 7 is not herein specially claimed, as it forms the subject of claims in another application for patent filed by me.

It is obvious that the improvements herein set forth and claimed are applicable to electric motors as well as generators.

What I claim as my invention is—

1. In a dynamo-electric machine or motor having a four-pole field-magnet, the combination, with said poles, of detachable pole-sections adapted to fill the interval between two adjoining poles, whereby said magnet may be converted into a two-pole magnet or reconverted into a four-pole magnet at pleasure.

2. In a dynamo-electric machine or motor, the combination, with two or more vertical field-magnet cores on the same side of the armature-shaft, of a detachable plate of iron formed in a single piece and secured to and bridging the tops of said cores, said plate being provided on its under side with a curved and grooved pole-piece formed in one piece with the same, as described, so that by detaching the plate the armature may be removed.

3. The combination, with the armature-bobbins, of separating-pieces adapted to fill the space between adjoining bobbins, and provided with wedge-shaped lips or projections $i$ to enter between the bobbin and the core, as described.

4. As a new article of manufacture, a commutator-disk of plastic insulating material having a retaining or strengthening rim or band, in which the disk is cast or molded and allowed to harden, so as to form a strong and firm union of the disk and band, as and for the purpose described.

5. In a dynamo-electric machine or motor, a commutator consisting, essentially, of a disk or plate of cement carrying the commutator plates or segments, combined with an outer metallic retaining rim or band, in which the cement disk is cast or molded, so as to form a strong and secure union between the band and disk, as and for the purpose described.

6. In a dynamo-electric machine or motor, a commutator consisting, essentially, of a concrete or other insulating disk cast in a metallic rim or band, and having the commutator-plates secured to one or both faces.

7. In a dynamo-electric machine or motor, the combination, with a supporting commutator disk or plate made of cement or other suitable plastic material cast in a strengthening-frame consisting of a retaining-rim and one or more radial wings or spokes.

8. In a dynamo-electric machine or motor, a commutator disk or plate of cement or other plastic material cast in a strengthening-frame composed, essentially, of a hub, spokes, and rim, in combination with commutator-segments secured to the face or faces of said disk.

9. The combination, with the disk or plate of cement and a strengthening metallic frame therefor, of commutator-segments provided with rectangular or radial projections bearing against the face of the disk and secured thereto by bolts or screws.

10. In a dynamo-electric machine or motor, a commutator having its conducting plates or segments disposed alternately on opposite faces of a non-conducting disk or plate.

11. The combination, in a dynamo-electric machine or motor, of a system of armature-coils, a commutator consisting, essentially, of a non-conducting disk or plate having its commutator-segments secured to its opposite faces, and connections from the armature system of coils taken in order to the commutator-plates on opposite sides of the disk alternately.

12. The combination, in a dynamo-electric machine or motor, of a supporting disk or plate, commutator-segments secured to opposite faces of the disk, a system of armature-coils connected to said segments, and compound brushes, one portion of which bears upon the segments on one side of the disk, while another portion bears upon the segments upon the opposite side of the disk.

13. In a commutator for dynamo-electric machines or motors, a compound commutator-brush having its two brushes secured at opposite ends of a pivoted support carried upon the usual rocker arm or frame, as described.

14. The combination, with the rocker-frame carrying the pivoted brush-holder, of a hub sleeved on the hub of the rocker and carrying a series of arms engaging with the pivoted brush-holders, as and for the purpose described.

15. In a dynamo-electric machine or motor, a Gramme or Pacinotti armature having its coils divided into two or more sets, with the coils of one set alternating with those of the other, a commutator-cylinder and brushes for each set, and connections from the commutator of one set to that of the other, whereby the currents developed in the two sets may be combined for tension.

16. In a dynamo-electric machine or motor, a four-pole field-magnet, an armature provided with two sets of bobbins alternating with one another, and having the coils of each set connected in closed circuit and to a separate commutator-cylinder, four commutator-brushes for each cylinder, connected in pairs, as described, and a connection from the positive compound brush of one cylinder to the negative compound brush of the other cylinder.

Signed at New York, in the county of New York and State of New York, this 27th day of January, 1885.

BENJAMIN F. ORTON.

Witnesses:
 THOS. TOOMEY,
 GEO. C. COFFIN.